July 18, 1939.  H. R. CRAGO  2,166,799
ADJUSTABLE HUMIDOSTAT
Filed March 5, 1936
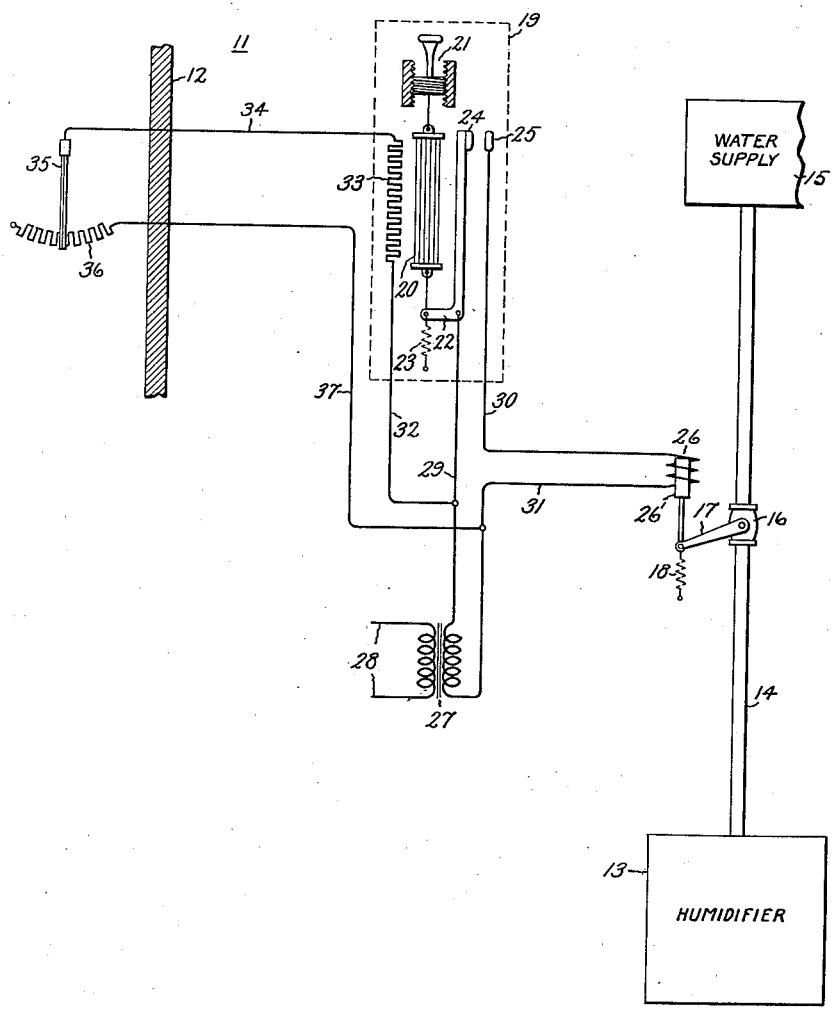
Inventor:
Harry R. Crago,
by Harry E. Dunham
His Attorney.

Patented July 18, 1939

2,166,799

UNITED STATES PATENT OFFICE 2,166,799

ADJUSTABLE HUMIDOSTAT

Harry R. Crago, Caldwell, N. J., assignor to General Electric Company, a corporation of New York Application March 5, 1936, Serial No. 67,298

4 Claims. (Cl. 236—44)

My invention relates to automatic control systems and particularly to automatic humidity control systems.

In the art of air conditioning it has been found desirable to maintain a lower humidity indoors when a lower temperature obtains outdoors. The reason for this is that there exists a very definite relation between outside temperature and the relative humidity that can be maintained indoors without the occurrence of condensation on windows and walls of the water vapor present in the air. The relationship is such that with lower outdoor temperatures it is necessary to maintain a lower relative humidity indoors. Thus, it has been the practice to vary the standard of relative humidity maintained within the space in accordance with variations in outdoor temperature and more particularly it has been the practice to decrease the standard of relative humidity in response to a decrease in outdoor temperature.

It is an object of my invention to provide a new and improved means for accomplishing the above result, and more particularly it is an object of my invention to provide a relative humidity responsive device with heating means locally associated therewith for varying the response of the humidostat.

A more specific object of my invention is to provide a relative humidity responsive device adapted to maintain the humidity within an enclosed space at a particular value with an independently energized and controlled heater for varying the standard of humidity maintained in the enclosed space by said humidity responsive means.

In the specific embodiment to be described later, the variation of the standard maintained by the humidostat is obtained through an electrical heating means which is energized and controlled independently of the humidity controlling device. The current flow to this heating means is controlled by an outdoor temperature responsive means, which may be a temperature responsive variable resistance, whereby the current flow to the heating means is varied in accordance with changes in outdoor temperature.

A more detailed understanding of the present invention may be secured from the following description taken in connection with the accompanying drawing in which is illustrated a preferred embodiment of the invention. The single figure of the drawing illustrates a diagrammatic representation of one form of my invention.

In the drawing I have illustrated an enclosed space 11 defined by a wall 12. This has been shown only diagrammatically but it is to be understood that by a space I mean a room, building or the like that is to be conditioned. Within this space there is positioned a humidifier 13 of any desired type. It will be understood by those skilled in the art that although I have shown the humidifier located within the space it is usual to position the humidifier without the space and my invention is applicable to humidifying systems irrespective of the location of the humidifier. The humidifier is supplied with water through a conduit 14 connected to a suitably positioned water reservoir 15. The flow of water to the humidifier is controlled by a valve 16 provided with an operating arm 17 normally biased to its closed position by a spring 18.

The operation of the valve regulating the flow of water is controlled by a relative humidity responsive device 19, preferably, but not necessarily, enclosed and positioned at any convenient point within the space. This device may be of any suitable construction and for purpose of illustration I have chosen a relative humidity responsive device utilizing human hair as the actuating element. The hairs are indicated by reference numeral 20 and these are fastened at one end to suitable adjusting means 21. Rotation of the adjusting means in one direction is adapted to increase the tension on the hairs and movement in the opposite direction decreases the tension, whereby the instrument may be adjusted to maintain any predetermined relative humidity.

The humidity responsive member 20 is adapted to act upon a pivoted contact carrying member 22 in opposition to the force of a spring 23. The pivoted member 22 carries a contact 24 cooperating with a stationary contact 25. The closure of the contacts just mentioned is adapted to energize a relay 26 controlling the position of the water valve 16 through a circuit including a transformer 27 connected to a suitable source of power 28. The energizing circuit for the relay leads from one side of the secondary winding of the transformer through conductor 29, the pivoted member 22, contacts 24 and 25 in their closed position, conductor 30, winding of relay 26, and conductor 31. When the above mentioned circuit is closed on a decrease in relative humidity below a predetermined value, relay 26 is energized and it actuates its associated armature member 26' upwardly to open the valve. Similarly, on an increase in relative humidity the aforesaid energizing circuit is opened and the valve is closed by the action of spring 18 to stop the flow of water to the humidifier.

The above described humidity controlling system is well known in the art, being extensively used with systems in which the temperature is maintained constant by suitable thermostatic control, and my invention does not in any manner depend on the type of control that may be used for maintaining the humidity within the space at any particular value. The auxiliary heater by means of which the humidity maintained in the room is varied is indicated at 33 and from the figure it may be noted that it is placed in close proximity to the humidity responsive element and in local heating conducting relationship thereto. One terminal of the electrical heater is connected to the secondary winding of the transformer through a conductor 32 and the opposite end is connected by a conductor 34 to an outdoor temperature responsive device 35. The latter is positioned at a point remote from the humidostat and may be located at any point outdoors although my invention in its broader aspects contemplates the positioning of the temperature responsive means either within or without the space. Associated with the temperature responsive device is an electrical resistance 36 connected by a conductor 37 to the opposite side of the transformer winding.

The operation of the above described system will now be given. As stated previously, the element 20 of the humidity responsive device contracts on a decrease in relative humidity and expands on an increase in humidity. Also, it will be assumed that the bimetallic element of the outdoor thermostat moves to the left in response to a decrease in temperature and to the right in response to an increase in temperature. The value of the heating element 33 is chosen to be such that when the resistance 36 is cut out from the circuit it will raise the temperature within the humidostat 30° when the room temperature is 70°, which temperature, it will be assumed, is maintained in the room. The outdoor thermostat and its associated resistance are so adjusted that all the resistance will be cut out at a temperature of 70° and the energizing circuit for the heater will be opened when the temperature outdoors falls to a value below 0°. In this manner the operation of the system will be such that whenever the temperature outdoors is below 0° the humidostat indoors will maintain the relative humidity at a value dependent only upon its setting. Furthermore, the operation of the humidostat will not be changed after the outdoor temperature exceeds a value above 70°. It is obvious that these values are merely used for the purpose of illustration and that the ranges of outdoor temperature or indoor humidity that may be used depend only upon the conditions to be maintained in various applications.

In describing the operation it will be further assumed that the humidostat is set to maintain a relative humidity of 15% at 70° which is the temperature to be maintained indoors. Thus, with temperatures below 0° obtaining outdoors the energizing circuit for the water valve controlling relay 25 will be closed by engagement of contacts 24 and 25 whenever the relative humidity within the space 11 falls below 15% because heater 33 is deenergized. When the humidifier has been in operation sufficiently long to raise the relative humidity above this value, the contacts will then be opened to deenergize a relay and cut off the supply of water to the humidifier.

If the temperature outdoors should rise to a value of 70°, it will be obvious from the figure that the heater 33 will be energized and thrown directly across the secondary winding of the transformer. In this event, the heater element will raise the temperature of the humidostat locally 30°. It will be remembered that the humidostat was assumed to be adjusted to maintain a relative humidity of 15%, but due to the influence of the additional heat the humidity within the room will be maintained at a value of 40%, with a temperature of 70° obtaining within the room. This results from the fact that the heat is applied only locally to the humidostat and the device will respond to maintain a relative humidity of 15% at a temperature of 100°, the temperature in the immediate vicinity of the humidostat. Remembering that the room temperature is maintained at 70°, it will be noted from a study of any psychrometric chart that maintenance of a relative humidity of 15% at 100° by the humidostat (requiring 44 grains of water vapor per pound of dry air) will result in the maintenance of a humidity of 40% within the room (at which value there also are 44 grains of water vapor per pound of dry air).

If the outdoor temperature should again decrease to a value where the heater is deenergized it is obvious that the humidostat would maintain a relative humidity of 15% within the room in the manner described above. At any outdoor temperature intermediate the limits of 0° and 70° the relative humidity maintained within the space will vary between 15% and 40%. Consequently, it is obvious to those skilled in the art that according to my invention the humidity maintained within an enclosure may be very easily varied in accordance with temperature changes.

One of the advantages of the invention resides in the fact that it may be vary readily applied to most of the existing humidity controls merely by the addition of a heater in proximity to the humidostat. While I have shown the heater as being enclosed within the casing of the humidostat, it should be noted that the heater might equally well be positioned on the outside of the humidostat but in close proximity thereto, or the humidostat may be constructed without a casing.

While my invention has been described in connection with an outdoor thermostat for varying the heat applied to the humidostat, my invention in its broadest aspects is not limited to this construction alone. The heating effect might be varied equally well by a thermostat positioned within the space being conditioned if it were desired to maintain different humidities within the room at different room temperatures in order to maintain a constant effective temperature therein.

What I claim as new and desire to secure by Letters Patent of the United States is:

1. In combination, a humidifier for humidifying a space, a device responsive to the relative humidity within said space for controlling said humidifier, heating means for locally heating the air adjacent said humidity responsive device, and an outdoor temperature responsive device associated with said heating means for increasing its heating effect upon said humidity responsive device in response to an increase in outdoor temperature and decreasing its heating effect upon said device in response to a decrease in temperature.

2. In combination, humidity control means normally operable in response to variations in the relative humidity of the air in a space from a predetermined value, and heating means for locally increasing the temperature of the air adjacent said relative humidity responsive means with respect to the temperature of the air in said space for varying the response of said humidity control means.

3. A humidity responsive control device having an electric heater for locally increasing the temperature of the air immediately adjacent said device above the temperature of the surrounding air to regulate the response of said device, and means for varying the energization of said heater.

4. In a humidity regulating system, the combination of a humidity control device, an adjustable relative humidity responsive element for operating said control device in response to variations in the relative humidity of a space from a predetermined value, an electric heater for locally increasing the temperature of the air immediately adjacent said element above the temperature of the air in said space to regulate the response of said element, and means for varying the energization of said heater.

HARRY R. CRAGO.